April 21, 1942.  O. O. BOWERS  2,280,742
ROTARY INTERNAL COMBUSTION ENGINE
Filed Aug. 17, 1940  3 Sheets-Sheet 1
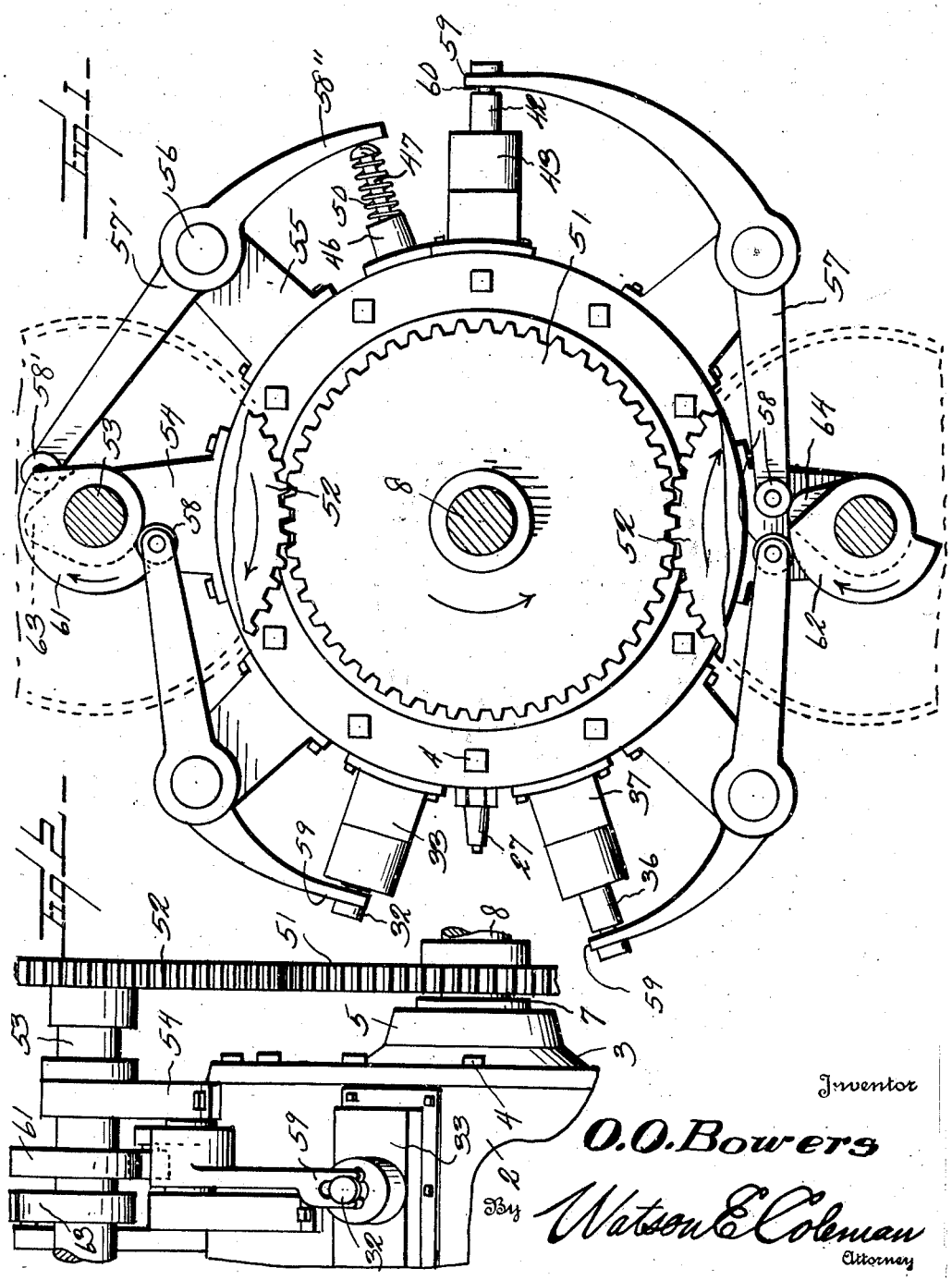
Inventor
O. O. Bowers
By Watson E. Coleman
Attorney April 21, 1942.   O. O. BOWERS   2,280,742
ROTARY INTERNAL COMBUSTION ENGINE
Filed Aug. 17, 1940   3 Sheets-Sheet 2
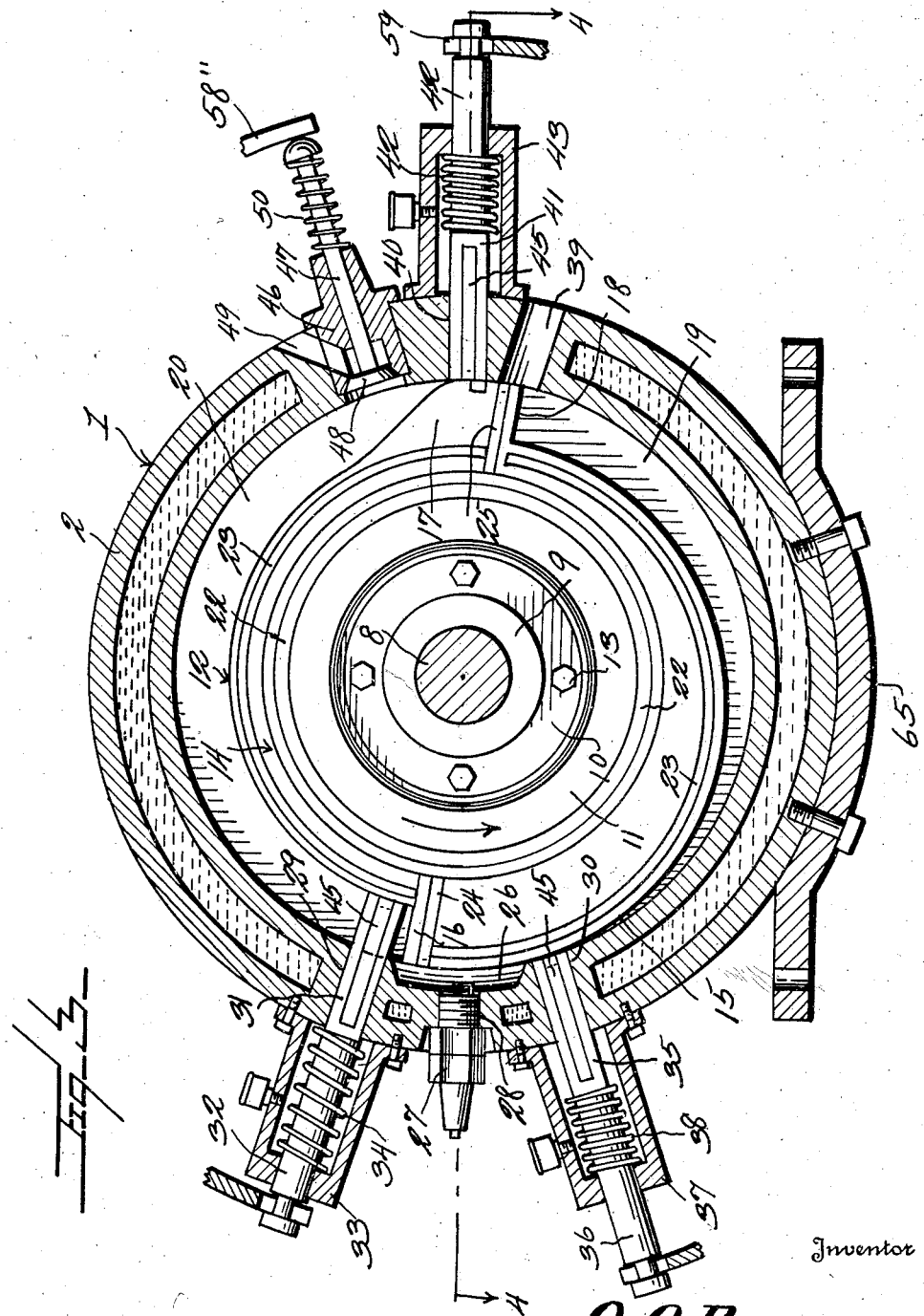
Inventor
O. O. Bowers
By Watson E. Coleman
Attorney April 21, 1942.   O. O. BOWERS   2,280,742
ROTARY INTERNAL COMBUSTION ENGINE
Filed Aug. 17, 1940   3 Sheets-Sheet 3
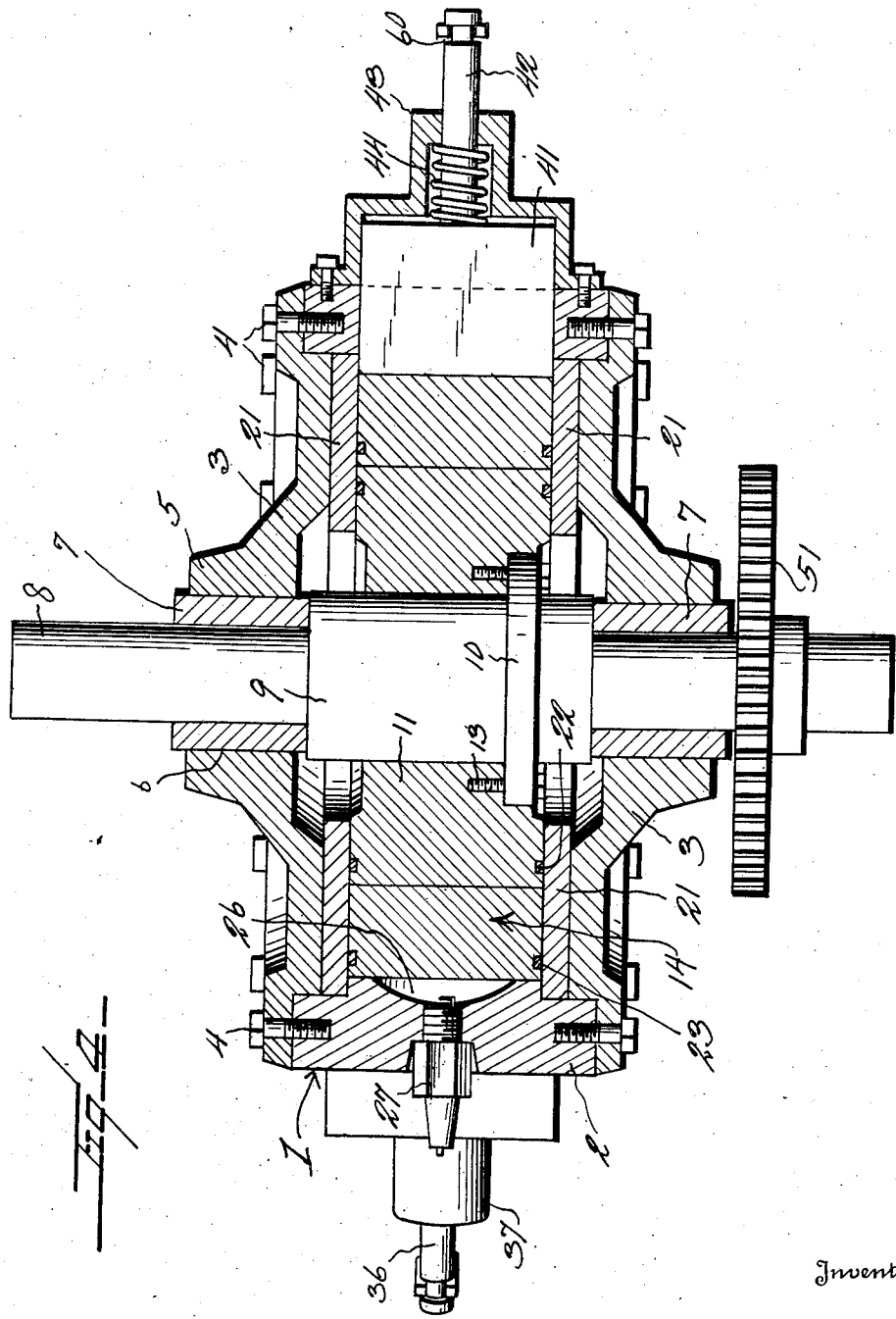
Inventor
O. O. Bowers
By Watson E. Coleman Patented Apr. 21, 1942

2,280,742

UNITED STATES PATENT OFFICE 2,280,742

ROTARY INTERNAL COMBUSTION ENGINE

Oliver O. Bowers, Cape Girardeau, Mo., assignor of one-third to Joe D. James and one-third to Norman W. Day, both of Cape Girardeau, Mo.

Application August 17, 1940, Serial No. 353,135

1 Claim. (Cl. 123—14)

This invention relates generally to the class of internal combustion engines and pertains particularly to improvements in rotary gas engines.

The primary object of the present invention is to provide a rotary gas engine of novel design by means of which certain advantages are had over gas engines of other designs, both rotary and reciprocating such, for example, as smallness as compared with the amount of power developed, the elimination of reciprocating pistons, piston pins, connecting rods, crank shafts and crank shaft bearings, a greater efficiency, a minimum number of replaceable parts and substantially complete elimination of vibration.

Another object of the invention is to provide in a rotary gas engine, a novel means for compressing a fuel charge and for igniting such compressed charge within a combustion chamber or area at the peak of compression whereby the maximum of efficiency of the ignited fuel is obtained.

A further object of the invention is to provide a rotary gas engine or motor which operates on the four-cycle principle but which has a power stroke upon each revolution of the rotor and shaft instead of upon every other revolution as is the case with the standard four-cycle engine.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claim.

In the drawings:

Fig. 1 is a view in side elevation of the engine constructed in accordance with the present invention, showing in elevation the valve operating gears together with the valve control means.

Fig. 2 is a fragmentary detailed view of a pair of valve cams, the valve arms actuated thereby, together with the gear means for controlling the cam.

Fig. 3 is a sectional view taken through the engine on a plane perpendicular to the axis of rotation for the rotor and at one side of the rotor.

Fig. 4 is a sectional view taken substantially on the line 4—4 of Fig. 3.

Referring now more particularly to the drawings, the numeral 1 generally designates the rotor housing which comprises the annular wall 2, the sides of which are closed by the housing side wall plates 3 which are bolted or otherwise suitably secured to the wall 2 by the bolts 4 and each of which has a central hub 5 through which is formed the shaft opening 6. In each of the hub openings 6 is a shaft bearing 7 and extending through the radial center of the circular housing is the shaft 8 which has a central portion of enlarged diameter, as indicated at 9, against the ends of which the adjacent bearings 7 bear, thus maintaining the shaft in position and against axial movement in the housing.

The central portion 9 of the shaft carries adjacent one end the encircling collar 10 to which collar is fixed or secured the hub 11 of the rotor body, which is indicated as a whole by the numeral 12.

The rotor, in addition to the hub portion 11, which is secured to the shaft collar 10 by the cap screws 13, consists of the ring 14 which encircles the hub 11, and is suitably secured to the hub to rotate therewith. This ring portion of the rotor is made up of a semi-circular portion 15 which is of gradually increasing thickness from one end to the other, the outer side of the end of greatest thickness bearing against the inner face of the annular wall 2 of the casing and forming the power piston 16 which operates in the manner hereinafter stated. The other half or semi-circular portion of the rotor ring 13 is formed to provide diametrically opposite from the power piston 16, a suction piston 17 which is relatively short circumferentially of the rotor and bears at its outer face against the inner surface of the annulus 2. Due to the tapering form of the power piston, the outer surface thereof substantially defines a cycloidal curvature which starts at the face 18 of the suction piston and terminates at the outer edge of the face of the explosion piston 16. Thus the interior of the chamber in which the rotor is located is divided into the two chambers 19 and 20, the chamber 19 constituting the fuel compression chamber while the chamber 20 constitutes the fuel explosion and expansion chamber.

Disposed within the casing between the side wall plates 3 and the adjacent faces of the rotor are the flat annular wear plates 21. The side face of the rotor hub 11 has fitted therein the annular packing rings 22 while the side faces of the rotor ring 14 also have fitted therein the packing rings 23 and these packing rings together with the rings 22 frictionally engage the adjacent faces of the wear plates 21 and prevent the loss of compression from the compression and explosion chambers. The sides and the faces of the piston bodies 16 and 17 also have countersunk therein the packing strips 24 and 25, respectively, which bear against the wear plates 21.

Formed in the inner face of the annular wall 2 and extending a short distance circumferentially thereof is a combustion pocket 26 into which the electrodes of a spark plug 27 project when such plug is secured in the spark plug opening 28 in the wall 2. At the ends of the pocket 26, valve slots 29 and 30 are formed through the annular wall of the housing, which slots open into the housing toward the periphery of the rotor and slidably disposed in the slot 29 is an abutment valve 31 having a stem 32 which extends radially outwardly through the housing 33 for an expansion spring 34. This spring engages the outer edge of the abutment valve and normally urges the same inwardly. In the valve slot 30 is a reciprocable valve 35 which functions as a compression valve. This valve likewise has a stem which is indicated at 36, which extends through the housing 37, the housing enclosing a control spring 38 which normally urges the compression valve inwardly.

Substantially diametrically opposite from the combustion pocket 26, the annular wall 2 is provided with an exhaust port 39 and directly radially opposite to the center of the combustion pocket, a slot 40 is formed in which is mounted the reciprocable exhaust valve 41. This valve carries the stem 42 which extends radially outwardly through the housing 43 and the housing 43 encloses an expansion spring 44 which normally urges the exhaust valve inwardly. All of the three valves 31, 35 and 41 are in the form of flat plates which are of a width equaling the width of the rotor and which move inwardly and outwardly across the chambers 19 and 20 during the operation of the motor. Each of these three valves is provided along its inner and side edges with a packing strip 45 for preventing loss of compression between the edges of the valves and the adjacent surfaces.

Upon the side of the exhaust valve 41 opposite from the exhaust port, a suitable opening is formed in the annular wall 2 to receive the guide body 46 for the stem 47 of a pocket type valve 48 which opens inwardly toward the rotor and which controls the passage of fuel through the fuel intake port 49, from a suitable source of supply, not shown. This intake valve stem is enclosed in and engaged by a control spring 50 which normally urges the valve to more outwardly and to its seat so as to normally urge the valve to closed position.

The several valves for the motor may be controlled in any suitable manner to effect their operation in the proper timing order for the operation of the engine in the manner hereinafter stated. One means is here shown for actuating the several valves which comprises the mounting on the rotor shaft of a drive gear 51, which is in mesh with two driven gears 52. The driven gears are supported upon shafts 53 which in turn are rotatably supported by bearing posts 54 which may be mounted upon the annular wall 2 of the motor casing.

Upon opposite sides of each of the cam shafts 53, there are mounted suitable bearing posts 55 which support rock shafts 56. The rock shafts adjacent to the valves 31, 35 and 41 carry cam rock levers 57, each of which at its cam end supports a cam contact roller or follower 58 while at its opposite end it is forked, an indicated at 59 for engagement with the outer end of the adjacent valve stem. Each of the adjacent valve stems is slotted, as indicated at 60, thus forming a reduced portion which engages in the rock lever fork 59 and establishing a loose coupling between the stem and the fork which permits the oscillation of the rock lever to urge the valve stems outwardly.

The cam lever associated with the fuel intake valve 48 is indicated by the numeral 57' and one end of this lever carries the cam follower roller 58' while the opposite end of the lever, which is indicated by the numeral 58", bears against the outer end of the intake valve stem 47, as shown in Figs. 1 and 3.

The abutment valve 31 is controlled by the cam 61 while the adjacent compression valve 35 is controlled by the cam 62 upon the opposite shaft from that which supports the cam 61. Upon the same shaft with the cam 61 is a pointed cam 63 which controls through the lever 57', the fuel intake valve 48. Upon the shaft supporting the cam 62 is a pointed cam 64 which engages the end of the adjacent cam lever which is coupled with the stem of the exhaust valve 41 for the actuation of this valve.

Any suitable means may be employed for supporting the motor, there being here shown a bed plate 65, Fig. 3, which is suitably secured to the rotor casing to support the same with the shaft horizontally disposed.

While in the present illustration of the invention, there has been shown a single rotor casing and a single rotor upon the shaft 8, it will be obvious to those versed in the art that a number of such casings may be arranged in coaxial relation to provide a corresponding number of rotors upon a single shaft if such construction is desired.

In the operation of the present motor, it may be assumed that the rotor in the position in which it is shown in Fig. 3, is ready to receive against the power or combustion piston 16, a power impulse. Such impulse is supplied by the ignition of compressed fuel in the pocket 26 and in the area between the face of the piston 16 and the closed abutment valve 31. The intake valve 48 is held closed and the compression and exhaust valves are held open. The rotor after receiving the power impulse turns counterclockwise as viewed in this figure and the compression valve remains in opened position after the face of the piston 16 passes it. The fuel intake piston moves past the exhaust valve 41 which is immediately closed and as the piston 17 moves past the fuel intake valve 48, this valve is opened so that fuel may be drawn in into the gradually enlarging space between the trailing face 18 of the piston 17 and the closed exhaust valve. As the piston 17 approaches and reaches a predetermined position with respect to the abutment valve 31, this valve will open to prevent the establishment of a back pressure between it and the piston 17 and the rotor continues to turn, the compression valve 35 still remaining in open position. Any products of combustion remaining in the area 19 from a previous fuel charge will be gradually forced out through the exhaust port 39. When the intake piston or suction piston 17 reaches and passes the compression valve 35, this valve will slide inwardly to closed position but the abutment valve 31 remains open. The piston 16 will now have reached and passed the exhaust valve 41 and as it continues to turn toward the compression valve 35, the fuel charge which will be in the tapered fuel compression chamber 19, which is now at the top of the motor instead of at the bottom part as it is illustrated in Fig. 3, will be gradually compressed against the compression valve as the piston 16 moves around towards this valve. As this is taking place, the compression valve will be gradually opened as it rides upon the outer faces of the body 15 which, as previously stated, gradually moves radially with respect to the rotor. When the piston 16 reaches the still opened abutment valve 31, the compression valve 35 will be fully moved outwardly, as shown in Fig. 3, and all of the fuel will be compressed within the combustion pocket 26. Just as soon as the face of the piston 16 passes the abutment valve 31, this valve closes or moves inwardly, thus securing the compressed fuel charge in the pocket 26 and between the face of the abutment valve and the face of the piston. The charge is now ignited and the cycle repeated.

From the foregoing, it will be readily seen that in this motor while there is obtained the successive steps of fuel intake, compression, explosion, and exhaust as in any four-cycle internal combustion motor, there is obtained, unlike the ordinary four-cycle combustion motor, a power stroke upon each revolution of the rotor.

The piston head 16 after passing the valve 41 is idling in so far as the power face thereof is concerned although it will, of course, be understood from the foregoing description that the advancing side of the piston will be compressing a fuel charge against the compression valve 35 which will then be in closed position. Likewise the piston 17 after it passes the valve 35 will not be performing any effective work in so far as its trailing face is concerned but the advancing side thereof will naturally be forcing ahead of it and out of the port 39 the products of combustion remaining from the last explosion. While some slight reduction of pressure will, of course, be set up upon the trailing sides of the pistons 16 and 17 after they respectively pass the valves 45 and 35 this will not be such as to prevent the desired operation of the machine but on the other hand has a desirable result because after the piston 17 has passed the port 39 the reduced pressure would cause the rapid sucking in of fresh air which would subsequently be ejected by the advancing side of the piston 16 and this would assist in cooling the engine parts.

What is claimed is:

A rotary internal combustion engine, comprising a circular casing having an annular peripheral wall, a shaft extending axially through the casing, means forming a combustion pocket in the inner face of the annular wall and directed into the casing, a rotor supported in the casing on said shaft and having a periphery spaced through the major portion of its extent from the annular wall, means forming a radially extending power piston body upon the rotor periphery which has contact with the inner surface of the annular wall, a fuel suction piston body extending radially from the rotor periphery to and contacting the inner surface of the annular wall substantially diametrically opposite from the first piston, a pair of radially shiftable abutment valves mounted for extension through the annular wall toward said rotor periphery and having said combustion pocket located therebetween, a radially shiftable abutment valve movable through said wall toward the rotor periphery and disposed opposite from the first valves, means forming an exhaust port between the last-mentioned valve and one of said first valves, a valved fuel inlet port opening into the casing adjacent to the last mentioned radially shiftable valve and upon the opposite side of the same from the exhaust port, and control mechanism for said valves by which that one of the pair of abutment valves nearest the exhaust port is open while the power piston is receiving a power impulse and the adjacent valve is closed, and the said last mentioned valve is closed immediately after the fuel suction piston has moved past it toward the inlet port and the inlet port valve is opened immediately after the passage of the fuel suction piston on its suction stroke.

OLIVER O. BOWERS.